United States Patent
Raetzman et al.

(10) Patent No.: US 10,524,405 B2
(45) Date of Patent: Jan. 7, 2020

(54) FILTER SYSTEM FOR AN AGRICULTURAL IMPLEMENT

(71) Applicant: CNH America LLC, New Holland, PA (US)

(72) Inventors: Ryan R. Raetzman, Lemont, IL (US); Marvin A. Prickel, Homer Glen, IL (US); Brian J. Anderson, Yorkville, IL (US); Travis Lester Harnetiaux, Bourbonnais, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 77 days.

(21) Appl. No.: 15/598,081

(22) Filed: May 17, 2017

(65) Prior Publication Data
US 2018/0332761 A1    Nov. 22, 2018

(51) Int. Cl.
| | | |
|---|---|---|
| *A01B 63/32* | (2006.01) | |
| *A01B 49/06* | (2006.01) | |
| *A01C 5/06* | (2006.01) | |
| *F15B 11/16* | (2006.01) | |
| *F15B 21/041* | (2019.01) | |

(52) U.S. Cl.
CPC ............. *A01B 63/32* (2013.01); *A01B 49/06* (2013.01); *A01C 5/068* (2013.01); *F15B 11/16* (2013.01); *F15B 21/041* (2013.01); *F15B 2211/615* (2013.01)

(58) Field of Classification Search
CPC ......... A01B 63/32; A01B 63/24; A01B 63/14; A01B 63/00; A01B 49/06; A01B 49/02; A01B 49/00; A01C 5/068; A01C 5/066; A01C 5/06; A01C 5/00; F15B 11/16; F15B 11/00; F15B 21/041; F15B 21/04; F15B 21/00; F15B 2211/615; F15B 2211/60; F15B 2211/00; F04B 41/02; F04B 41/00

See application file for complete search history.

(56) References Cited

U.S. PATENT DOCUMENTS

| | | |
|---|---|---|
| 5,419,401 A | 5/1995 | Castagno |
| 5,511,499 A | 4/1996 | Edinger |
| 8,684,636 B2 | 4/2014 | Dunstan |
| 9,072,217 B2 | 7/2015 | Kapphahn |
| 2014/0366497 A1 | 12/2014 | Noack et al. |
| 2015/0282422 A1 | 10/2015 | Hahn et al. |

*Primary Examiner* — Christopher J. Novosad
(74) *Attorney, Agent, or Firm* — Rebecca L. Henkel; Rickard K. DeMille

(57) ABSTRACT

An agricultural implement system includes a row unit configured to dispose seed into a ground trench, and a closing system corresponding to the row unit configured to close the ground trench after disposition of the seed. The agricultural implement system further includes a double acting cylinder mechanically coupled to the closing system. The double acting cylinder comprises a cylinder side port, a rod side port, and a fluid source fluidly coupled to the cylinder side port and configured to provide a cylinder side fluid. The agricultural implement system additionally includes an inlet filter fluidly coupled to the rod side port and configured to filter fluid entering the double acting cylinder via the rod side port.

10 Claims, 4 Drawing Sheets

FILTER SYSTEM FOR AN AGRICULTURAL IMPLEMENT

BACKGROUND

The invention relates generally to agricultural implements. Specifically, the embodiments disclosed herein generally relate to improved filter systems for agricultural implements.

Many types of agricultural implements are used for a variety of tasks, such as planting, cultivating, tilling, and harvesting. For example, seeders and planters are agricultural implements that include devices that create a trench in soil, deposit seeds into the trench, and then fill or "close" the trench. A seeding/planting agricultural implement may include a bulk seed tank coupled to a tow bar and wing assemblies coupled to either side of the tow bar. The wing assemblies typically include tool bars that extend perpendicular from the tow bar, row units that perform the farming operation and are mounted on the tool bars, and supporting wheel assemblies disposed along the length of the tool bars. The bulk seed tank may be used to transport seed for future crops. Trenches may be created, a trench corresponding to a row unit. The seeds are then deposited in rows via the row units. A closing system may "close" the trenched row, thus planting the seeds at a desired depth. It would be beneficial to improve operations of agricultural implements, such as planters.

BRIEF DESCRIPTION

In one embodiment, an agricultural implement system includes a row unit, the row unit configured to dispose seed into a ground trench, and closing system corresponding to the row unit, the closing system configured to close the ground trench after disposition of the seed. The agricultural implement system further includes a double acting cylinder mechanically coupled to the closing system, the double acting cylinder comprising a cylinder side port and a rod side port and a fluid source fluidly coupled to the cylinder side port and configured to provide a cylinder side fluid. The agricultural implement system additionally includes a filter fluidly coupled to the rod side port and configured to provide a filtered fluid entering the double acting cylinder via the rod side port.

In another embodiment, agricultural implement system includes a pneumatic system and a row unit. The pneumatic system includes a fluid source configured to provide a cylinder side fluid to a cylinder side port of a double acting cylinder and a rod side fluid to a rod side port of the double acting cylinder. The pneumatic system additionally includes a filter coupled to the rod side port and configured to filter the rod side fluid entering the double acting cylinder via the rod side port. The row unit has the double acting cylinder, wherein the row unit is configured to dispose seed into a ground trench.

In a further embodiment, an agricultural implement system includes a double acting cylinder, wherein the double acting cylinder is configured to provide pneumatic power for agricultural operations. The agricultural implement system further includes a pneumatic system. The pneumatic system includes a fluid source configured to provide a cylinder side fluid to a cylinder side port of a double acting cylinder and a rod side fluid to a rod side port of the double acting cylinder. The pneumatic system additionally includes a filter coupled to the rod side port and configured to filter the rod side fluid entering the double acting cylinder via the rod side port.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Agricultural implements, for example, planters, may include a bulk fill seed tank or tanks for carrying seed. During planting operations, the seed may be provided to one or more row units suitable for depositing the seed in furrows or trenches. For example, the planter equipment may transfer seed from the bulk fill seed tanks and deposit the seeds in the ground at a desired depth and row spacing. The trenches may then be "closed" via a closing system which may include closing wheels.

The techniques described herein provide for systems and methods that filter a fluid, such as air, that may be used in one example, in planting operations. More specifically, the filtered air may be used to power one or more air cylinder, such as doubling acting air cylinders that may be used to provide a "down" bias or pressure suitable for driving a closing system towards ground during planting operations. In one embodiment, an air compressor supplies compressed air at a desired pressure, flow rate, and so on, suitable for driving the double acting cylinders, which may in turn provide for hydraulic actuation of the closing system.

The double acting cylinders described herein may each include two fluid (e.g., air) ports. A first fluid port may be disposed on a cylinder side (e.g., closing side) of the double acting cylinder and fluidly coupled to air incoming from the air compressor so as to engage or otherwise actuate a rod. A second fluid port may be disposed on a rod side of the double acting cylinder and fluidly coupled to an air filter. The air filter may provide for filtered air flowing into the rod side of the double acting cylinder, for example, to return the rod to a start position. Accordingly, cleaner air may be provided, enhancing life of various systems, such as the double acting cylinders, the air compressor, the row units, hoses, and the like.

Figure 1:
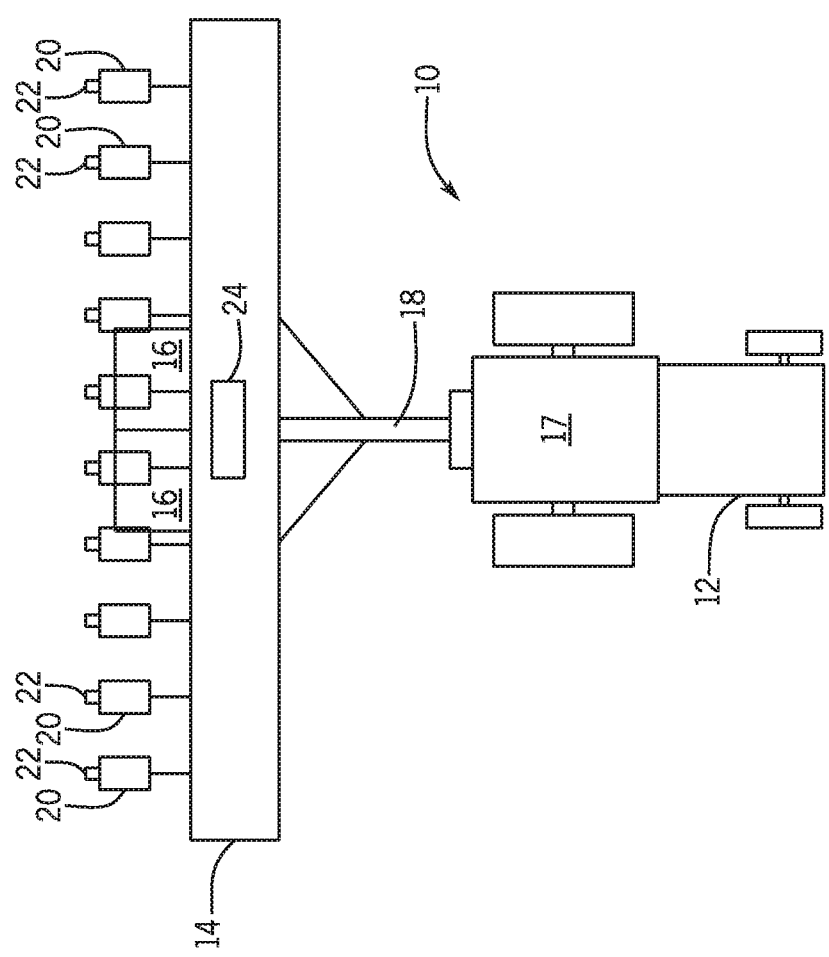
FIG. 1 is a top block view of an agricultural implement that may include a bulk fill seed tank suitable for transporting seed during farming operations and a plurality of row units suitable for planting seed, in accordance with an embodiment of the present approach.

For illustrations purposes describing an agricultural implement that may include a filtered air system, FIG. 1 is a top block view of an embodiment of an agricultural system 10. The agricultural system 10 includes an agricultural vehicle 12 and an agricultural implement 14 and two bulk fill seed tanks 16. In some embodiments, the agricultural implement 14 and bulk fill seed tanks 16 may be towed behind the agricultural vehicle 12 (e.g., as shown in FIG. 1). The agricultural vehicle 12 may be any vehicle suitable for towing the agricultural implement 14, such as a tractor, off-road vehicle, work vehicle, or the like. The agricultural vehicle 12 may include a cab 17, in which an operator sits during operation of the agricultural vehicle 12. The cab 17 may be an open or closed cab. Additionally, the agricultural implement 14 may be any suitable implement, such as a ground-engaging implement (e.g., a soil conditioner, a tillage implement, a fertilizer application implement, a planter, a seeder, or a combination thereof) or a sprayer/applicator, suitable for agricultural use. The agricultural implement 14 may be coupled to the agricultural vehicle 12 via a hitch system 18. The hitch system 18 may rigidly couple the agricultural implement 14 to the vehicle 12, such that the implement 14 can move upward and downward, but cannot freely rotate with respect to the vehicle 12. It should be understood, however that other systems for coupling the implement 14 to the vehicle 12 may be possible.

As depicted, the agricultural implement includes multiple row units 20. While 10 row units 20 are shown, it is to be understood that the agricultural implement 14 may include between 6 to 36 or more row units 20. Seed from the bulk tanks 16 may be provided to each individual row unit 20 for planting. During planting operations, a trench may created and the row units 20 may dispose the seeds in the trench. After deposition of the seed, a closing system 22 (e.g., including closing wheel(s)) may close up or otherwise fill the trench, thus planting the seed. In certain embodiments, the closing system 22 be mechanically coupled to or include one or more double acting cylinders. For example, the double acting cylinders may provide for a down bias or force suitable for driving the closing system 22 towards the ground when closing the trench.

As further described below, actuation power for the double acting cylinders may be provided via a fluid source 24, such as an air compressor system. For example, the air compressor system 24 may filter and compress air and then deliver the filtered and compressed air to a first port (e.g., cylinder side port) of each of the double acting cylinders, causing the double acting cylinder's rod to "push" the closing system 22 downwards. Return air may be provided to a second port (e.g., rod side port) of the double acting cylinders via a single return air filter to move the rod back or otherwise "return" the rod to a start position. By providing for filtered air, including filtered air on rod side ports of the double acting cylinders, the techniques described herein may increase system life and improve farming operations.

Figure 2:
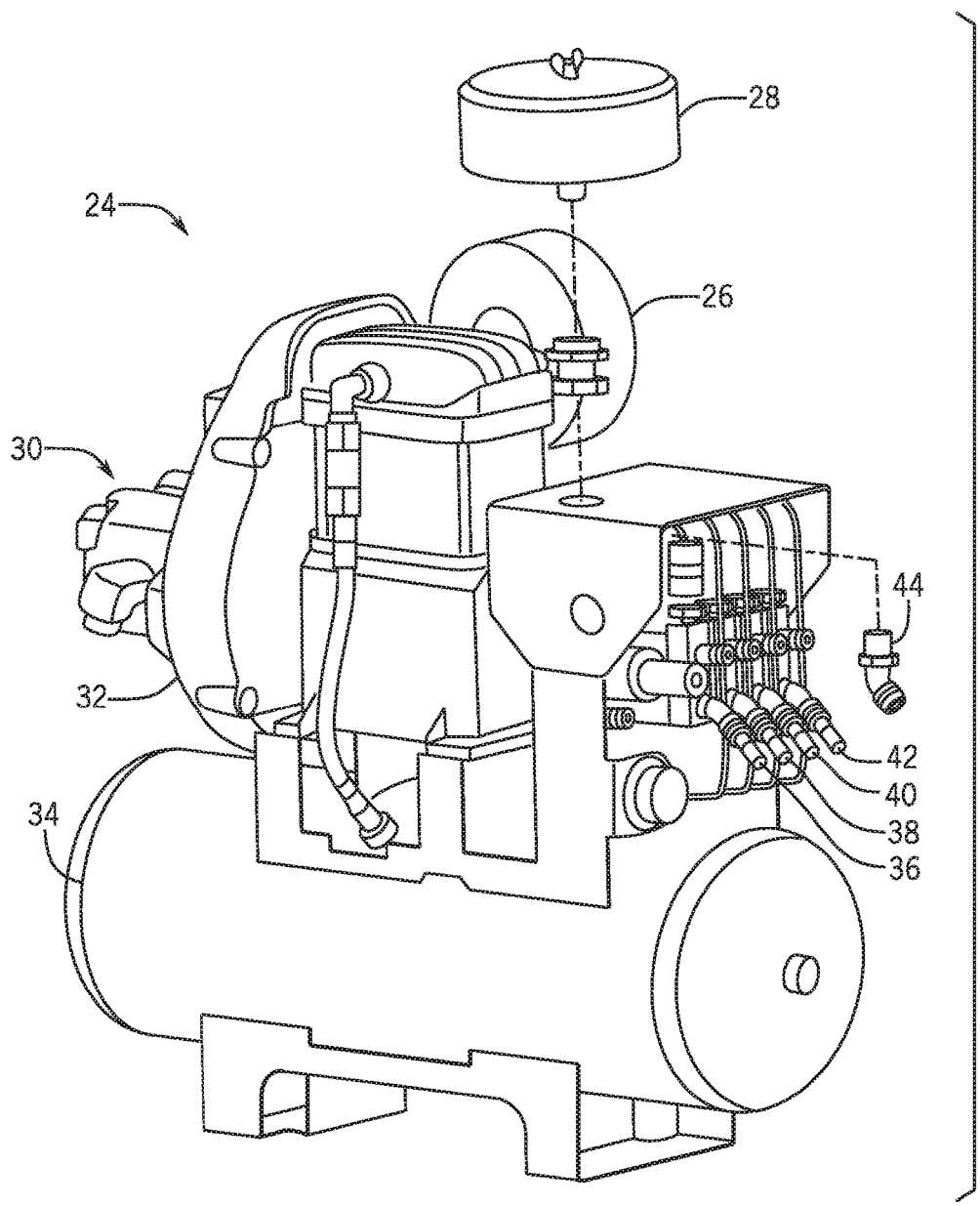
FIG. 2 is a perspective view illustrating an embodiment of a fluid source system suitable for delivering a fluid, e.g., air, to systems or components of the agricultural system of FIG. 1.

It may be beneficial to show a perspective view of an embodiment of the air compressor system 24 configured to deliver air into, for example, one or more double acting cylinders. Turning now to FIG. 2, is a perspective view illustrating an embodiment of the air compressor system 24. In the depicted embodiment, the air compressor includes two air filters 26 and 28. During operations of the air compressor system 24, incoming air may first be filtered by the filter 26 and subsequently compressed via a motor (e.g., electric motor, gas-powered motor, diesel motor) 34. The filtered compressed air may be delivered via a hose or conduit 34 to be stored in an air storage tank 34. One or more valves 36, 38, 40, and 42 may then be actuated to provide the filtered compressed air. For example, one or more of the valves 36, 38, 40 and 42 may be fluidly coupled to a cylinder side port in the double acting cylinders and thus actuate the air cylinders by moving a rod.

Actuation of the double acting cylinders may then cause the closing systems 22 to operate as desired, thus closing the trench after the deposition of the seeds. Return air suitable for repositioning a rod of the air cylinders may be directed via port 44, which may be fluidly coupled to an air filter 28. Accordingly, all return air used to "return" or move back rods of double acting cylinders, such as air entering a rod side of the double acting cylinders, may be filtered via air filter 28. While a single air filter 28 is shown in an exploded view, it is to be understood that more than one filter 28 may be used to filter all rod side fluid from double acting cylinders. Further, other detritus-removing devices may be used in lieu of or in addition to the filter(s) 28, including membranes, air bags, and the like. As shown, the filter 28 is disposed on the air compressor system 24 and near the filter 26 so as to more efficiently provide for filter changes. That is, close proximity of the filters 26 and 28 may aid maintenance time during filter changes. For example, the filter 28 may be disposed 2 ft. or less from the filter 26. Further, the filter 26 and 28 may be the same type of filter and have the same threaded pattern. Indeed, in one embodiment, the filters 26 and 28 are interchangeable with each other.

Figure 3:
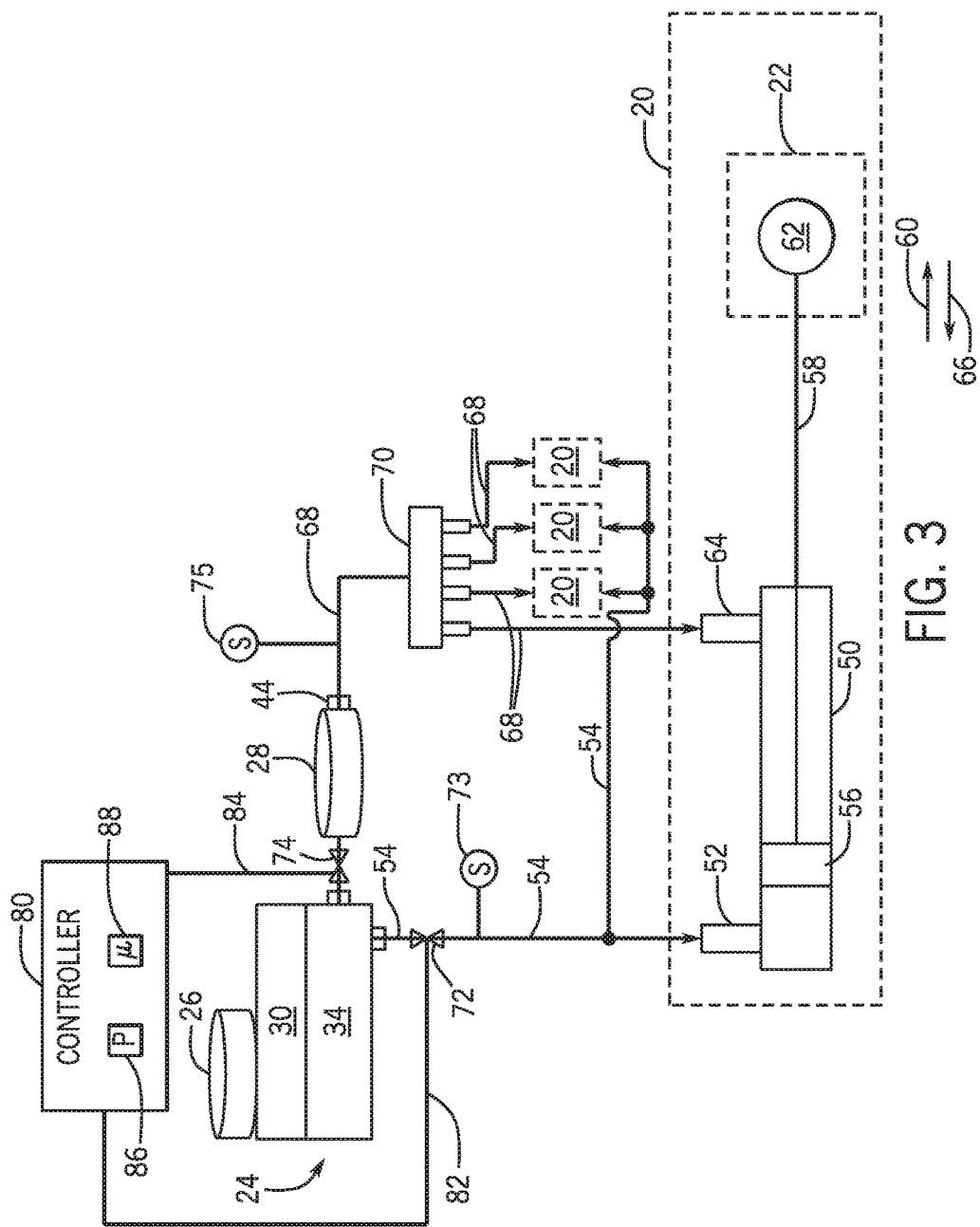
FIG. 3 is a block view of an embodiment of the fluid source of FIG. 1 fluidly coupled to a double acting air cylinder, in accordance with an embodiment of the present approach.

Turning now to FIG. 3, the figure is a block view of an embodiment of the air compressor system 24 and rod side air filter 28 fluidly coupled to a double acting cylinder 50. Because the figure utilizes like elements as those found in the figures above, the like elements are illustrated using like element numbers. As shown, the figure illustrates the air compressor system 24 fluidly connected to a cylinder side port 52 of the double acting cylinder 50. During operations, the air compressor system 24 may provide compressed filtered fluid (e.g., air filtered via the filter 26) into the cylinder side port 52 via conduit system 54. Accordingly, the fluid may push a cylinder 56 of the double acting cylinder 50 so as to move a rod 58 in a direction 60.

As depicted, the rod 58 may be mechanically coupled, either directly or indirectly (e.g., via mechanical linkages and the like), to one or more closing wheels 62 included in the closing system 22. As the rod 58 moves in the direction 60, the rod 58 may provide a desired force or bias suitable for driving the closing wheels 62 towards the ground, which in turn may result in closing a trench during forward movement of the agricultural implement 14.

When it is desired to retract the rod 58, for example to stop providing the bias force, a fluid such as air may be provided to a rod side port 64 of the double acting cylinder 50 via a conduit system 68. The rod 58 may then retract in a direction 66 back towards a start position. The techniques described herein provide for filtered or otherwise "clean" fluid, such as air, entering the rod side port 64. In the depicted embodiment, the air filter 28 is used to provide the filtered air through the rod side port 64. While several filters 26 may be used to provide filtration to the rod side port of one or more double acting cylinders 50. Using a single filter 28 may enhance maintenance, for example, by enabling a single filter 28 change. In the depicted embodiment, the conduit system 68 may include a manifold 70 used to fluidly couple the single air filter 26 to one or more of the double acting cylinders 50. For example, each of the depicted row units 20 may include one or more of the double acting cylinders 50 which may have its respective rod side port 64 coupled to the filter 28 via the manifold 70.

In the depicted embodiment, one row unit 20 is shown in detailed block view to illustrate the included the double acting cylinders 50, while three other row units 20 are shown but not in detailed block view. It is to be understood that 2, 3, 4, 5, or more (e.g., between 2 and 50) row units 20 may be provided and linked to the single air filter 28 via the conduit system 68. It is also to be noted that the manifold 70 is for example only, and in other embodiments, the manifold 70 may be replaced with tee fitting(s), multiple conduits, and/or other pneumatic elements, for example as described below with respect to FIG. 4. Indeed, the techniques described herein enable a placement of the filter 28 directly upstream of the rod side ports 64, or a placement of the manifold 70 or tee directly upstream of the rod side ports 64 and the filter 28 directly upstream of the manifold 70 or tee.

Also shown are valves 72, 74 which may be operatively coupled to a controller 80. More specifically, the controller 80 may communicate via wired and/or wireless conduits 82, 84 to open or close the valves 72, 74. The controller may also be communicatively coupled to sensors 73, 74. The sensors 73, 75 may include pressure sensors, flow rate sensors, and the like. The controller 80 may additionally include one or more processors 86 and a memory system 88 that may execute software programs to perform the disclosed techniques. Moreover, the processors 86 may include multiple microprocessors, one or more "general-purpose" microprocessors, one or more special-purpose microprocessors, and/or one or more application specific integrated circuits (ASICS), or some combination thereof. For example, the processors 86 may include one or more reduced instruction set (RISC) processors. The memory system 88 may store information such as control software, configuration data, etc. The memory system 88 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

The controller 80 may automate certain operations. For example, the controller 80 may be used maintain a desired pressure on the closing system 22 by modulating the valves 72, 74. For example, the controller 80 may sense pressure and/or flow through sensors 73, 75 and then turn on/off the valves 72, 74 based on the sensed information. The controller 80 may also include a running counter of that may count hours of operations, and may use the counter to determine a desired time for replacing of the filters 26, 28 with new filters. As mentioned earlier, the filters 26, 28 may be disposed within close proximity of each other, as shown in FIG. 2, thus making replacement of both filters more efficient. It is to be noted that the valve 72 may be one of the valves 36-42 described earlier and that the valve 74 may be coupled to the port 44.

Figure 4:
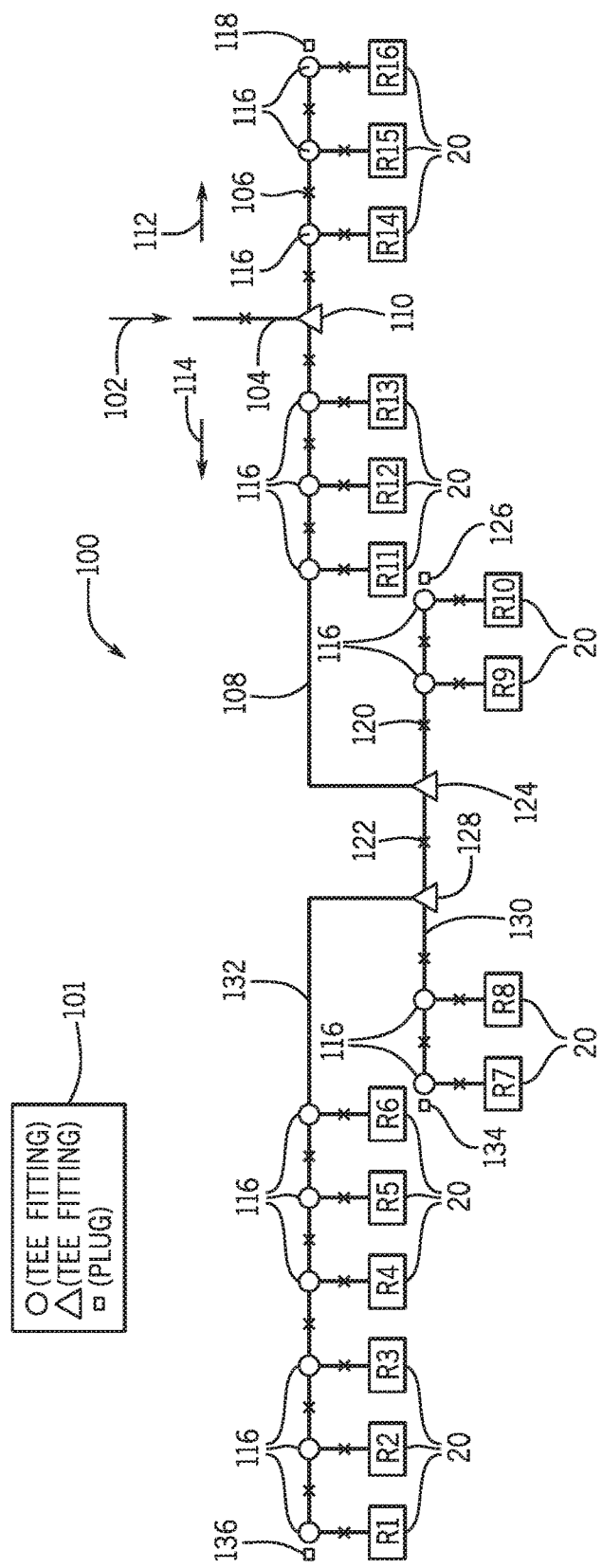
FIG. 4 is a schematic view of an embodiment of a pneumatic circuit including 16 row units of a planter, in accordance with an embodiment of the present approach.

Turning now to FIG. 4, the figure is a schematic illustrating an embodiment of a pneumatic circuit 100 having a legend 101 suitable for delivering fluid tor agricultural implements 14 having multiple row units 20. More specifically, the pneumatic circuit 100 illustrates the use of 16 row units 20. In the illustrated embodiment, the pneumatic circuit 100 may be used to deliver air to the 16 row units 20 via certain conduit sections and tee fittings. The pneumatic circuit 100, for example, may be included in the conduit system 54 or 68. In the depicted embodiment, the air compressor system 24 delivers fluid 102 (e.g., air), which may include filtered air, into the 16 row units 20 through a conduit section 104. The conduit section 104 may be fluidly coupled to a conduit section 106 and to a conduit section 108 via a tee fitting 110. Accordingly, the air in the conduit section 106 may be flowing in a direction 112 and air in the conduit section 108 may be flowing in a direction 114. The row units 20 may each be coupled to the conduit sections 106 and 108, as well as to other displayed conduit sections, via tee fittings 116. Further, the conduit section 106 may be "capped" via a plug 118.

Air flowing in the direction 114 may then enter a conduit section 120 and a conduit section 122 via a tee fitting 124. The conduit section 120 may be further capped via a plug 126. Fluid entering the conduit section 122 may then be split via a tee fitting 128 to flow into conduit sections 130 and 132. In turn, conduit sections 130 and 132 may be capped via plugs 134, 136, respectively. By providing for a pneumatic circuit 100 as illustrated, air may be delivered to all of the 16 row units for use, for example, during seeding operations, closing operations, and so on. Indeed, filtered air may be delivered to rod side ports of double acting cylinders which may be used, for example, in closing systems 22.

Technical effects of the invention include the ability to provide filter air to rod side ports of double acting cylinders to filter "return" air. In certain embodiment, the double acting cylinders may use the return air to move back or otherwise return a rod towards a start position. The rod may provide pneumatic power for agricultural operations, such as closing operations of a planter. A controller may be used to deliver the pneumatic power and to monitor the filtering, such as monitoring hours of use of the filter.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a row unit, the row unit configured to dispose seed into a ground trench;
a closing system corresponding to the row unit, the closing system configured to close the ground trench after disposition of the seed;
a double acting cylinder mechanically coupled to the closing system, the double acting cylinder comprising a cylinder side port and a rod side port;
a fluid source fluidly coupled to the cylinder side port and configured to provide a cylinder side fluid; and
an inlet filter fluidly coupled to the rod side port and configured to provide a filtered fluid entering the double acting cylinder via the rod side port.

2. The agricultural implement system of claim 1, wherein the inlet filter is disposed directly upstream of the rod side port.

3. The agricultural implement system of claim 1, comprising a manifold, a tee fitting, or combination thereof, wherein the inlet filter is disposed directly upstream of the manifold, the tee fitting, or the combination thereof, and wherein the manifold, the tee fitting, or the combination thereof, are disposed directly upstream of the rod side port.

4. The agricultural implement system of claim 1, comprising a first valve fluidly coupled to the fluid source and configured to open and to close to deliver the cylinder side fluid and a second valve fluidly coupled to the inlet filter and configured to open and to close to deliver the filtered fluid.

5. The agricultural implement system of claim 4, comprising a controller operatively coupled to the first valve and to the second valve and configured to open and to close the first valve and the second valve to deliver the cylinder side fluid and the filtered fluid.

6. The agricultural implement system of claim 5, wherein the controller is configured to derive a first pressure suitable for closing the ground trench and wherein the controller is configured to open or close the first valve based on the first pressure.

7. The agricultural implement system of claim 6, wherein the controller is configured to derive a second pressure suitable for returning a rod of the double acting cylinder towards a start position, and wherein the controller is configured to open or the close the second valve based on the second pressure.

8. The agricultural implement system of claim 1, comprising a second row unit, a second closing system corresponding to the second row unit, and a second double acting cylinder mechanically coupled to the second closing system, the second double acting cylinder comprising a second cylinder side port and a second rod side port, wherein the fluid source is coupled to the second cylinder side port and configured to provide the cylinder side fluid, and wherein the inlet filter is fluidly coupled to the second rod side port and configured to provide the filtered fluid entering the second double acting cylinder via the second rod side port.

9. The agricultural implement system of claim 1, wherein the agricultural implement comprises a planter having a plurality of row units, and wherein the row unit is included in the plurality of row units.

10. The agricultural implement system of claim 1, comprising a second filter included in an air compressor, the second filter configured to filter a compressor intake air, wherein the fluid source comprises the air compressor.

* * * * *